(12) United States Patent
Kurose

(10) Patent No.: US 9,954,823 B2
(45) Date of Patent: Apr. 24, 2018

(54) ENGINEERING METHOD AND ESTABLISHING SYSTEM

(71) Applicant: YOKOGAWA ELECTRIC CORPORATION, Musashino-shi, Tokyo (JP)

(72) Inventor: Takahiro Kurose, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 14/676,984

(22) Filed: Apr. 2, 2015

(65) Prior Publication Data
US 2015/0295895 A1  Oct. 15, 2015

(30) Foreign Application Priority Data
Apr. 10, 2014  (JP) ................................ 2014-080914

(51) Int. Cl.
*H04L 29/06* (2006.01)
*G06F 17/50* (2006.01)
(Continued)

(52) U.S. Cl.
CPC ...... *H04L 63/0272* (2013.01); *G06F 9/45558* (2013.01); *G06F 17/50* (2013.01);
(Continued)

(58) Field of Classification Search
CPC ............ G06Q 10/063; G06Q 10/0633; G06Q 10/103; H04L 63/0272; G06F 9/45558
(Continued)

(56) References Cited

U.S. PATENT DOCUMENTS 6,321,337 B1 * 11/2001 Reshef .................... G06F 21/53
726/14
6,823,340 B1    11/2004 Clark
(Continued)

FOREIGN PATENT DOCUMENTS

JP    2002-074240 A    3/2002
JP    2006215956 A    8/2006
(Continued)

*Primary Examiner* — Alexander Lagor
*Assistant Examiner* — William B Jones
(74) *Attorney, Agent, or Firm* — Sughrue Mion, PLLC

(57) ABSTRACT

An engineering method for establishing an engineering system includes establishing the engineering system in a virtual system by performing a communication and permitting an access to the virtual system via an internet, the communication being performed by using a service which is provided via the internet, the service being used by a first communication system which is connected to the internet, the virtual system being disposed in the first communication system, and the virtual system virtually implementing the engineering system, and inspecting the engineering system by performing an access to an inspection system via a virtual private network, the access is performed by a second communication system which is connected to the virtual private network, the inspection system being disposed in the second communication system, and the inspection system inspecting operations of the engineering system which is established in the virtual system.

15 Claims, 11 Drawing Sheets

(51) Int. Cl.
*H04L 29/08* (2006.01)
*G06F 9/455* (2018.01)
*G06Q 10/06* (2012.01)

(52) U.S. Cl.
CPC ............ *G06Q 10/06* (2013.01); *H04L 63/10* (2013.01); *H04L 67/10* (2013.01); *G06F 2009/45595* (2013.01)

(58) Field of Classification Search
USPC .......................................................... 726/15
See application file for complete search history.

(56) References Cited

U.S. PATENT DOCUMENTS

| | | |
|---|---|---|
| 2009/0288084 A1 | 11/2009 | Astete et al. |
| 2010/0115342 A1 | 5/2010 | Shigeta et al. |
| 2012/0192249 A1* | 7/2012 | Raleigh ............ G06Q 10/06375 726/2 |
| 2012/0198414 A1 | 8/2012 | Chen et al. |
| 2013/0138818 A1 | 5/2013 | Wolf |
| 2013/0212163 A1 | 8/2013 | Shimomoto |
| 2013/0297922 A1* | 11/2013 | Friedman ................. G06F 8/63 713/2 |
| 2014/0052489 A1 | 2/2014 | Prieto |

FOREIGN PATENT DOCUMENTS

| | | |
|---|---|---|
| JP | 200993249 A | 4/2009 |
| JP | 2010113381 A | 5/2010 |

\* cited by examiner

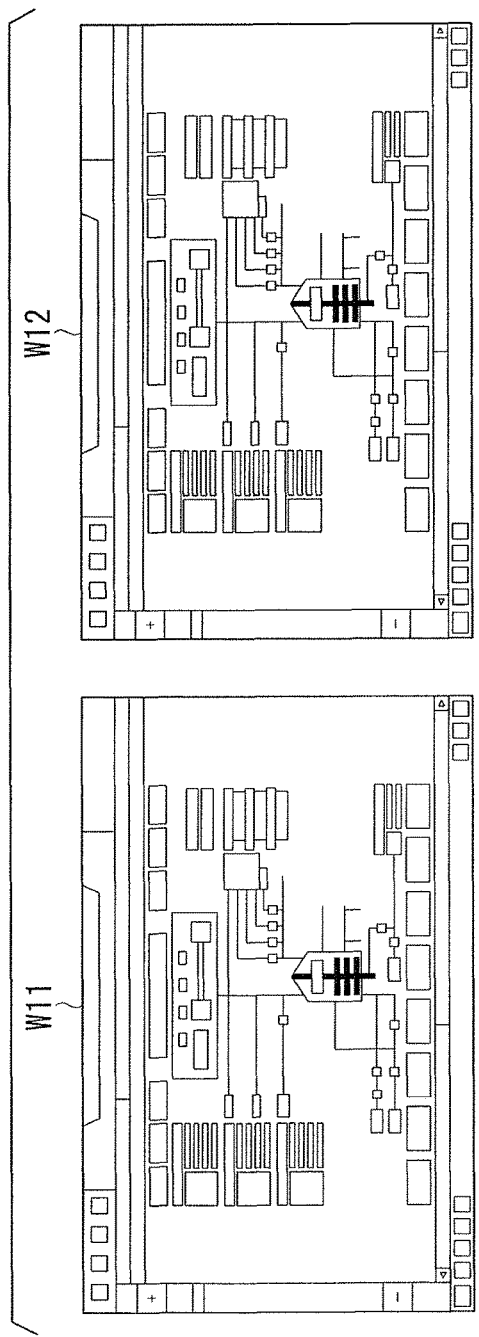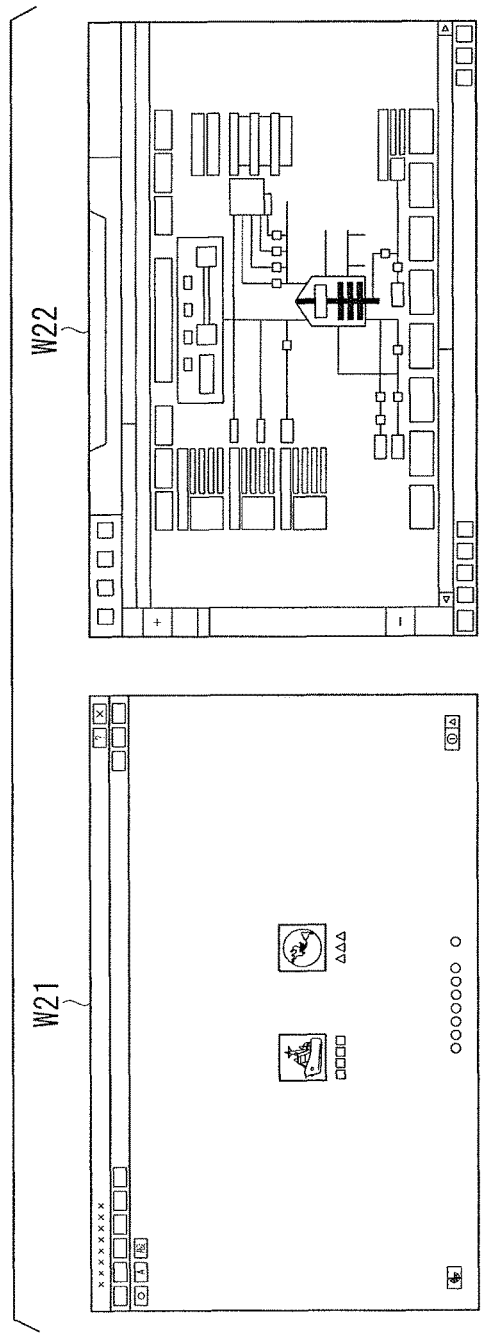
FIG. 9A
FIG. 9B

ENGINEERING METHOD AND ESTABLISHING SYSTEM

BACKGROUND OF THE INVENTION

Field of the Invention

The disclosure relates to an engineering method and an establishing system.

Priority is claimed on Japanese Patent Application No. 2014-080914, filed Apr. 10, 2014, the contents of which are incorporated herein by reference.

Description of Related Art

In a plant and a factory, so as to implement an advanced and secure automatic operation, various types of systems (engineering systems) such as a DCS (Distributed Control System) and an SIS (Safety Instrument System) are installed. A client (for example, a contractee), an engineering company (for example, a contractor), and a third vendor (a third party) have a meeting thoroughly and inspect the engineering system in the presence of them from an early phase of a system establishment to when the system establishment is completed. This makes the engineering systems be established.

Specifically, as shown in FIG. 11, the engineering system is established through three phases described below. FIG. 11 is a drawing illustrating the phases performed for establishing the engineering system.

(1) FEED (Front End Engineering Design) Phase

In a feed phase, the client, the engineering company, and the third vendor examine technical problems, estimated costs, and so on while keeping close contacts with each other, so as not to be changed significantly in an engineering phase which is next to the feed phase. In the feed phase, it is usually the case that the client always stays in the engineering company and the various types of examination described above are conducted.

(2) Engineering Phase

In an engineering phase, a basic design (BD) and a detailed design (DD) are conducted, hardware is ordered, software is programed, and an operation test (Internal Test: IT) is conducted. In the engineering phase, it is often the case that the client checks. Also, in the engineering phase, the concerned parties (the client, the engineering company, and the third vendor) get together in one place, and a factory acceptance test (FAT) for inspecting software and hardware in the presence of the concerned parties is conducted.

(3) Site Activity Phase

In a site activity phase, the concerned parties get together in an actual plant, and a site acceptance test (SAT) for testing an operation of the engineering system installed in the plant is conducted. Thereafter, a performance inspection (Commissioning) is conducted. In Japanese Unexamined Patent Application Publication No. 2002-74240, an example of a method for implementing a conventional instrumentation engineering system is disclosed.

Conventionally, the concerned parties basically get together in one place so as to conduct the meeting and the inspection in the presence of the concerned parties. In a case where the concerned parties cannot get together in one place, they exchange messages and files by e-mail and a FTP (File Transfer Protocol) server so as to communicate with each other. Recently, it is often the case that they communicate with each other by using a remote access (a technology for connecting to a computer from outside and operating the computer), for example, by accessing a computer in the engineering company.

However, the conventional method described above has problems described below with respect to each phases.

(1) Feed Phase

Because there is a need to have thorough meetings, engineers are required to work for a long time.

Computers and network environments for inspecting the system are needed.

(2) Engineering Phase

There is a need for the concerned parties to get together in one place, and much travel expenses and much traveling time are needed.

An additional system for testing is needed until a target system is completed.

A large space for staging is needed when the inspection is conducted in the presence of the concerned parties.

In a case of using the remote access, there is a possibility of getting a malware and being hacked. Also, because the display of the computer is occupied, it is difficult to know the operation from outside, and the response is slow.

A test of communicating with the third vendor cannot be conducted.

(3) Site Activity Phase

Skilled engineers have been held for a long time.

Long time is needed to understand a situation of field site.

SUMMARY

An engineering method for establishing an engineering system may include establishing the engineering system in a virtual system by performing a communication and permitting an access to the virtual system via an internet, the communication being performed by using a service which is provided via the internet, the service being used by a first communication system which is connected to the internet, the virtual system being disposed in the first communication system, and the virtual system virtually implementing the engineering system, and inspecting the engineering system by performing an access to an inspection system via a virtual private network, the access is performed by a second communication system which is connected to the virtual private network, the inspection system being disposed in the second communication system, and the inspection system inspecting operations of the engineering system which is established in the virtual system.

Further features and aspects of the present disclosure will become apparent from the following detailed description of exemplary embodiments with reference to the attached drawings.

BRIEF DESCRIPTION OF THE DRAWINGS

FIG. 9A is a drawing illustrating an example of a display screen of the present embodiment when the factory acceptance test is conducted.

FIG. 9B is a drawing illustrating an example of a display screen of the old way when the factory acceptance test is conducted.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an engineering method and an establishing system which can implement an environment in which the concerned parties can virtually get together in one place and virtually conduct meetings, engineering works, and inspecting the engineering system in the presence of the concerned parties, even if the concerned parties are in a remote location.

Figure 1:
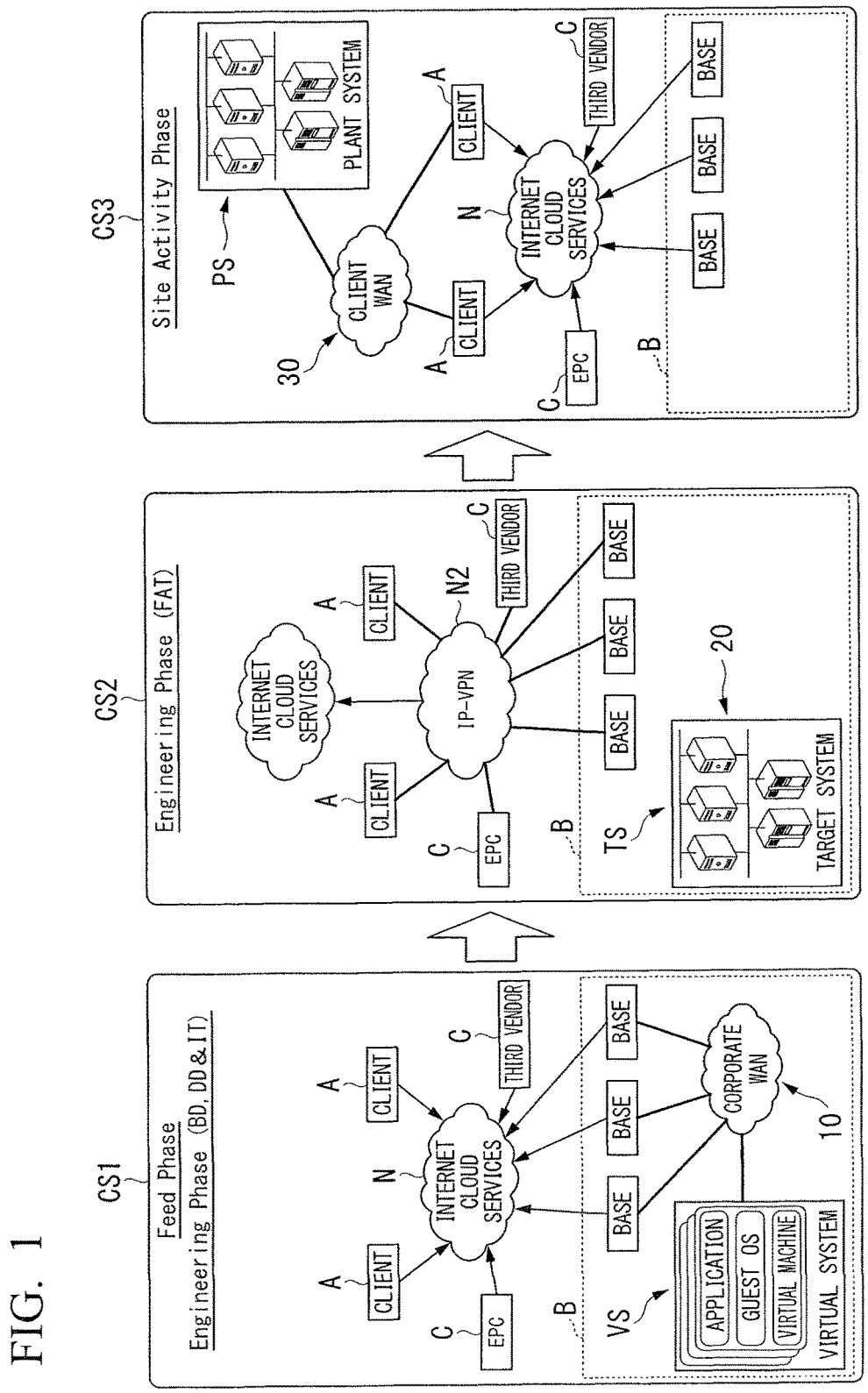
FIG. 1 is a drawing illustrating a communication system which is used by the engineering method and the establishing system in the present embodiment.

Embodiments of the engineering method will be described below, with references made to the drawings. FIG. 1 is a drawing illustrating a communication system which is used by the engineering method and the establishing system in the present embodiment. As shown in FIG. 1, in the present embodiment, when the engineering system is established, three communication systems CS1 to CS3 which are different from each other are used sequentially.

(General Description of the Communication Systems CS1 to CS3)

Figure 11:
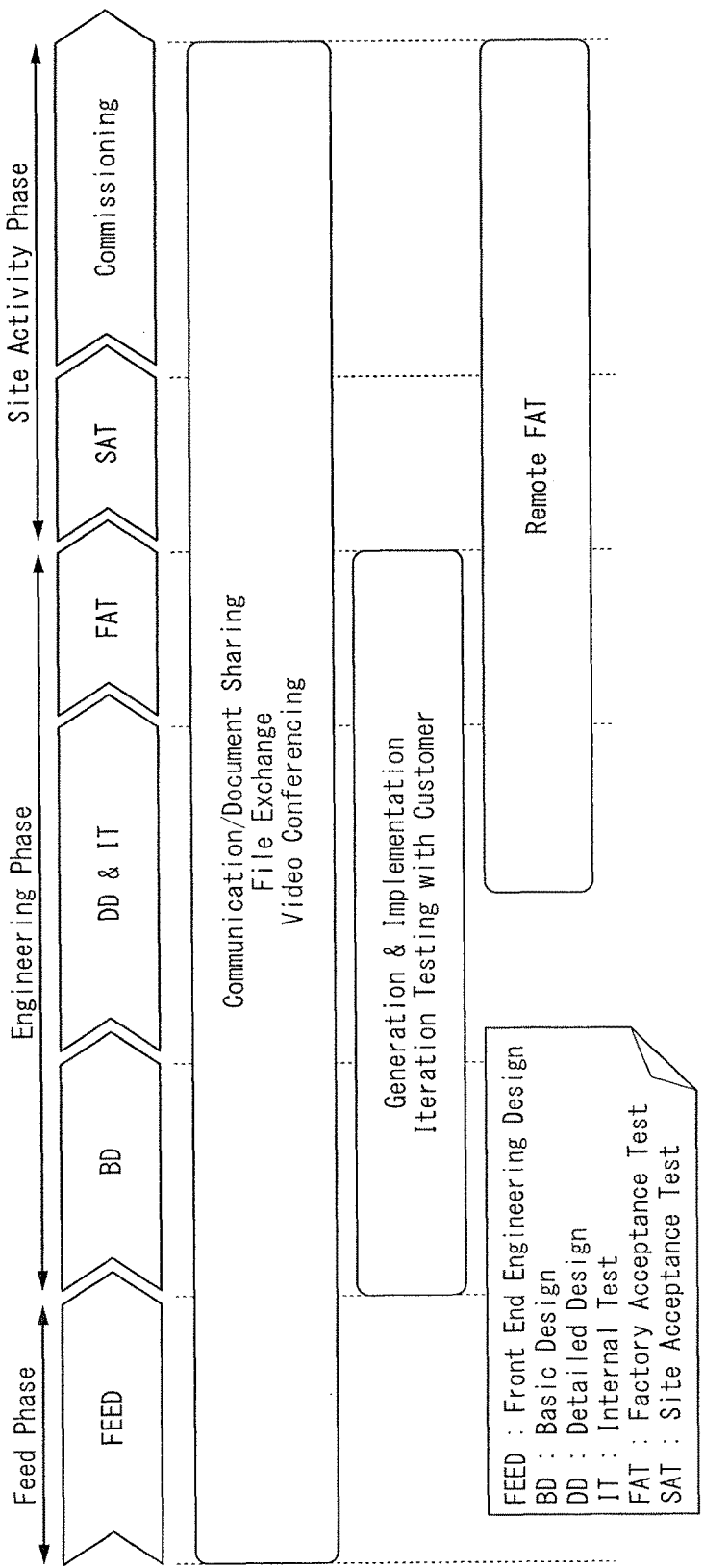
FIG. 11 is a drawing illustrating phases which are conducted so as to establish the engineering system.

The communication system CS1 is used at the basic design (BD), the detailed design (DD), and the internal test (IT) in the feed phase and the engineering phase which are shown in FIG. 11. The communication system CS1 is used at an early phase of establishing the engineering system. The communication system CS1 is used to virtually implement the engineering system, which is to be established, on a virtual system VS while keeping close contacts with a client A, an engineering company B, a third vendor and EPC (Engineering Procurement Construction). Hereinbelow, so as to describe simply, the third vendor and the EPC are referred to as "third vendor C".

The communication system CS2 is used at the factory acceptance test (FAT) in the engineering phase shown in FIG. 11. The communication system CS2 implements the engineering system, which is virtually established by the communication system CS1, as a target system TS. Specifically, the target system TS is implemented by installing the engineering system, which is ordered by the client A, in a FAT area in a base of the engineering company B, and connecting the installed engineering system to a corporate network. Although details will be described later, display contents of the target system TS and the virtual system VS are shown in FIG. 9A. The communication system CS2 is used to implement the environment in which the client A, the engineering company B, and the third vendor C, which are in a remote location, virtually get together in one place and virtually inspect the engineering system in the presence of the concerned parties.

The communication system CS3 is used in the site activity phase shown in FIG. 11. The communication system CS3 is used at an end phase of establishing the engineering system. The communication system CS3 is used to examine an actual engineering system (a plant system PS), which is actually established, while keeping close contacts with a client A, an engineering company B, a third vendor C.

(Detail Descriptions of the Communication System CS1)

Figure 2:
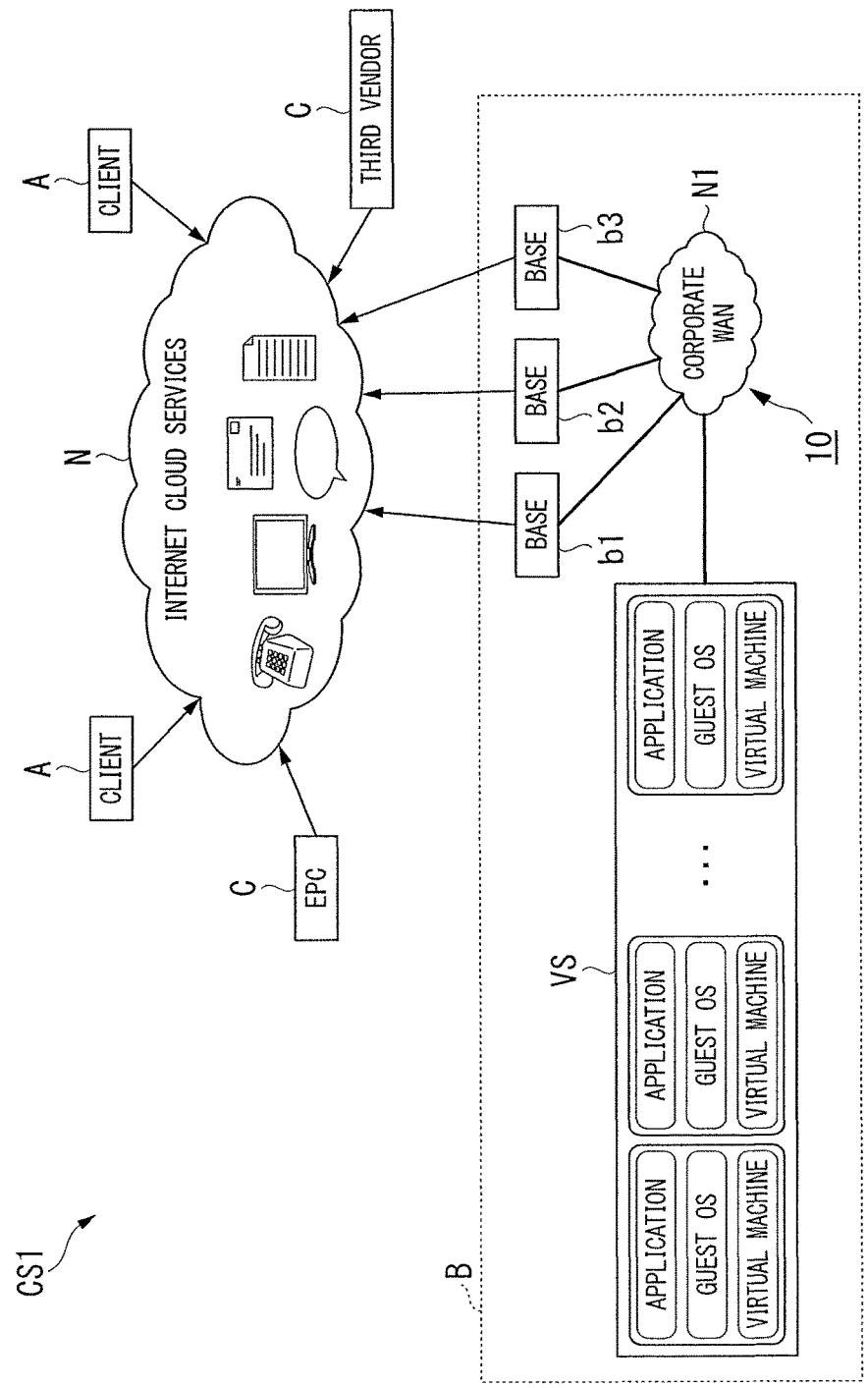
FIG. 2 is a drawing illustrating the communication system CS1 used in the engineering method and the establishing system in the present embodiment.

FIG. 2 is a drawing illustrating the communication system CS1 used in the engineering method and the establishing system in the present embodiment. As shown in FIG. 2, in the communication system CS1, the client A, bases b1 to b3 in the engineering company B, and the third vendor C are connected to each other via the internet (first network) N. The client A, the bases b1 to b3 in the engineering company B, and the third vendor C can communicate by using various types of services (internet cloud services) which are provided via the internet N.

As the internet cloud services, for example, a mail service, an IP telephone service, a file sharing service, an instant messaging service, and a television conference service are taken. More specifically, computers and networks in the client A, the bases b1 to b3 in the engineering company B, and the third vendor C are connected to the network N. However, for descriptive purposes, it is described in the present embodiment that the client A, the bases b1 to b3 in the engineering company B, and the third vendor C are connected to the network N.

As shown in FIG. 2, a communication system 10 (a first communication system) which has a corporate network N1 connecting between the bases b1 to b3 and a virtual system VS is disposed in the engineering company B. The bases b1 to b3 are such bases as a development base, a production base, a sales base, or other bases which are established in Japan or foreign countries. For this reason, the corporate network N1 is established as a WAN (Wide Area Network).

Terminal devices (for example, terminal devices 11 and 12 shown in FIG. 3) are disposed in the bases b1 to b3. The terminal devices are connected to the internet N and the corporate network N1, and the terminal devices can access the virtual system VS. The client A and the third vendor C cannot directly access the virtual system VS which is disposed in the engineering company B. However, in a case where the client A and the third vendor C are allowed by an engineer who operates the terminal devices 11 and 12 which are disposed in the bases b1 to b3, the client A and the third vendor C can indirectly access the virtual system VS via the terminal devices 11 and 12 which are operated by the engineer.

The virtual system VS is a system for virtually implementing an engineering system (for example, a distributed control system) which is to be established, and for implementing an engineering environment of target-less. The virtual system VS runs a guest OS (Operating System) and applications on a virtual machine VM. The guest OS is used by the engineering system which is to be established. For example, the application is a program for implementing the distributed control system.

Figure 3:
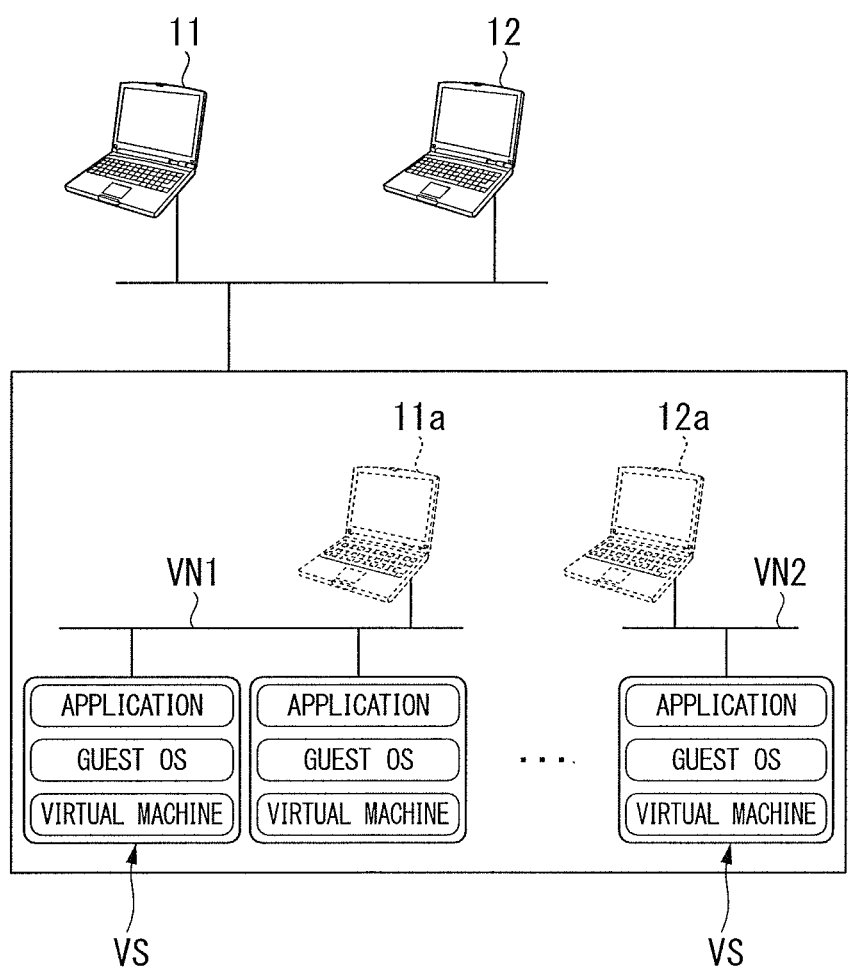
FIG. 3 is a drawing illustrating a connection situation of the virtual system which is used in the present embodiment.

FIG. 3 is a drawing illustrating a connection situation of the virtual system which is used in the present embodiment. As shown in FIG. 3, so as not to be affected by other networks (for example, an office network) which is established in the engineering company B, the virtual system VS is established to be connected to a virtual networks VN1 and VN2. The terminal devices (the terminal devices 11 and 12 shown in FIG. 3), which are disposed in the bases b1 to b3, are connected to the virtual system VS by using an SSL-VPN (Secure Sockets Layer-Virtual Private Network).

For the reason, the terminal devices 11 and 12 can access the virtual system VS as terminal devices (terminal devices 11a and 12a shown in FIG. 3) which are virtually connected to the virtual networks VN1 and VN2 respectively. The virtual networks are divided for projects so as to establish a network environment which is more secure, and a same IP address architecture can be established. However, necessary external connections are permitted so as to apply a patch of the operating system and antivirus.

(Detail Descriptions of the Communication System CS2)

Figure 4:
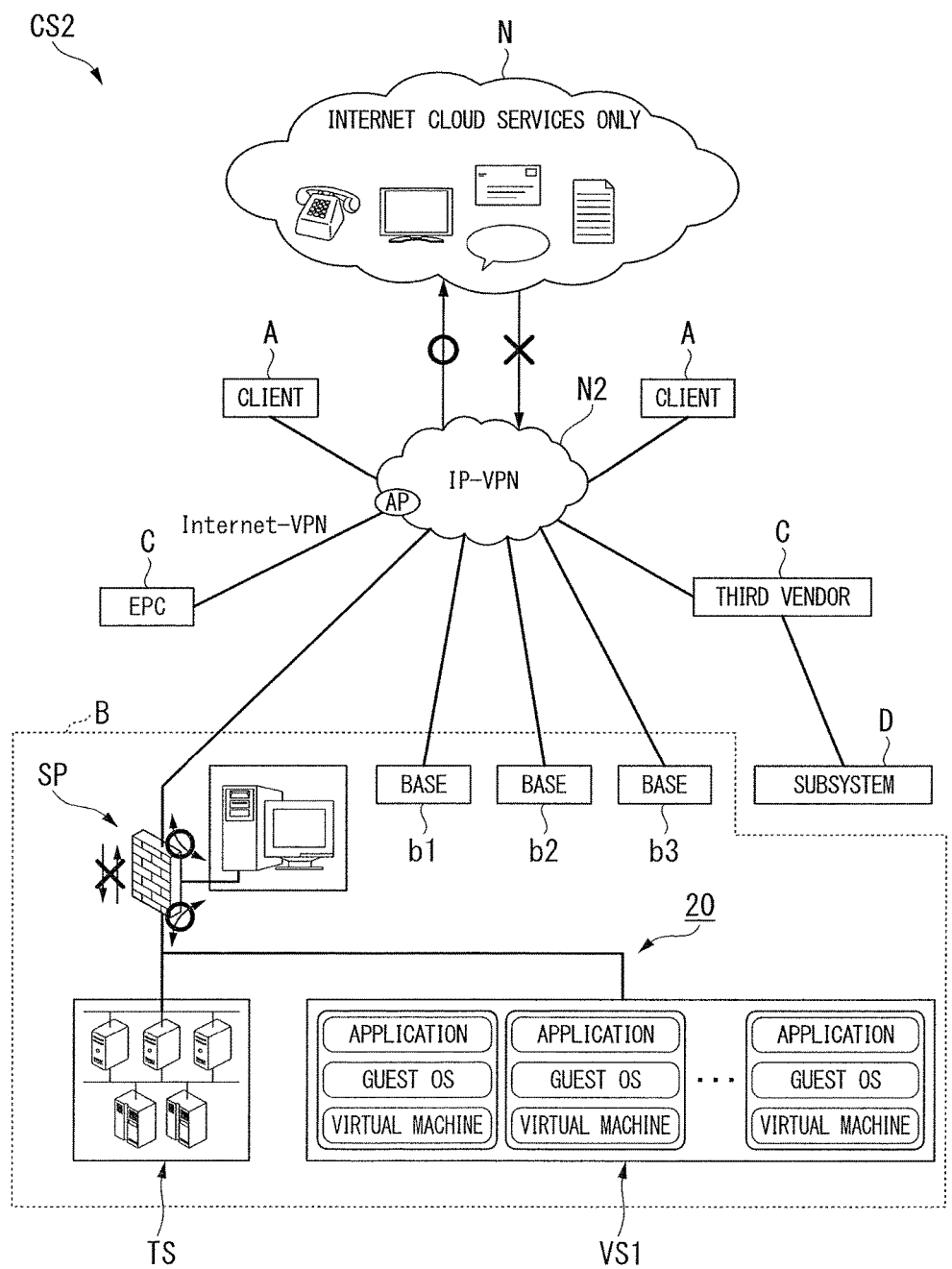
FIG. 4 is a drawing illustrating the communication system CS2 used in the engineering method and the establishing system in the present embodiment.

FIG. 4 is a drawing illustrating the communication system CS2 used in the engineering method and the establishing system in the present embodiment. As shown in FIG. 4, in the communication system CS2, the client A, the bases b1 to b3 and a target system TS (or the virtual system VS1) in the engineering company B, and the third vendor C are connected to each other via a private line (second network) N2. For example, the private line N2 is a virtual private network. The private line N2 is established by using an IP-VPN (Internet Protocol-Virtual Private Network). The private line N2 is separated from a network (for example, an office network) which is established by the client A, the engineering company B, and the third vendor C.

The private line N2 is connected to the internet N so that the services which are provided from the private line N2 via the internet N can be accessed, and the access from the internet N to the private line N2 is inhibited. That is, although the access from the private line N2 to the internet N can be permitted in a limited way, the access from the internet N to the private line N2 is inhibited. This access control is performed so that the communication between the client A, the engineering company B, and the third vendor C can be implemented appropriately, and an unauthorized access from the internet N to the target system TS via the private line N2 can be inhibited.

As shown in FIG. 4, a communication system 20 (a second communication system) is disposed in the engineering company B. The communication system 20 is connected to the private line N2 and equipped with the target system TS (an inspection system). The target system TS is a system for inspecting the operation of the engineering system which is virtually established in the virtual system VS shown in FIG. 2. A virtual system VS1, which is the same as the virtual system VS shown in FIG. 2, can be established along with the target system TS before the target system TS is completed.

In the communication system 20, a step system SP (a relay system) is disposed between the private line N2 and the target system (or the virtual system VS1). The step system SP is disposed so as to convert between a communication protocol used by the private line N2 and a communication protocol used by the communication system 20. Also, the step system SP is disposed so as to improve security when the client A, the bases b1 to b3 in the engineering company B, and the third vendor C perform remote access to the target system TS.

Specifically, because the communication via the private line N2 has a problem of delay in accordance with a distance, UDP (User Datagram Protocol) is used as a communication protocol. On the other hand, the communication system 20 is different from the communication via the private line N2, because the communication system 20 does not have the problem of delay, TCP/IP (Transmission Control Protocol/Internet Protocol) is used as a communication protocol. The step system SP converts between UDP and TCP/IP.

The step system SP censors the remote access from the client A, the bases b1 to b3 in the engineering company B, and the third vendor C to the target system TS (or the virtual system VS1) via the private line N2, so that it can be prevented that the target system TS is infected with a malware and hacked. That is, the step system SP indirectly performs the remote access from the client A, the bases b1 to b3 in the engineering company B, and the third vendor C to the target system TS (or the virtual system VS1).

Figure 5:
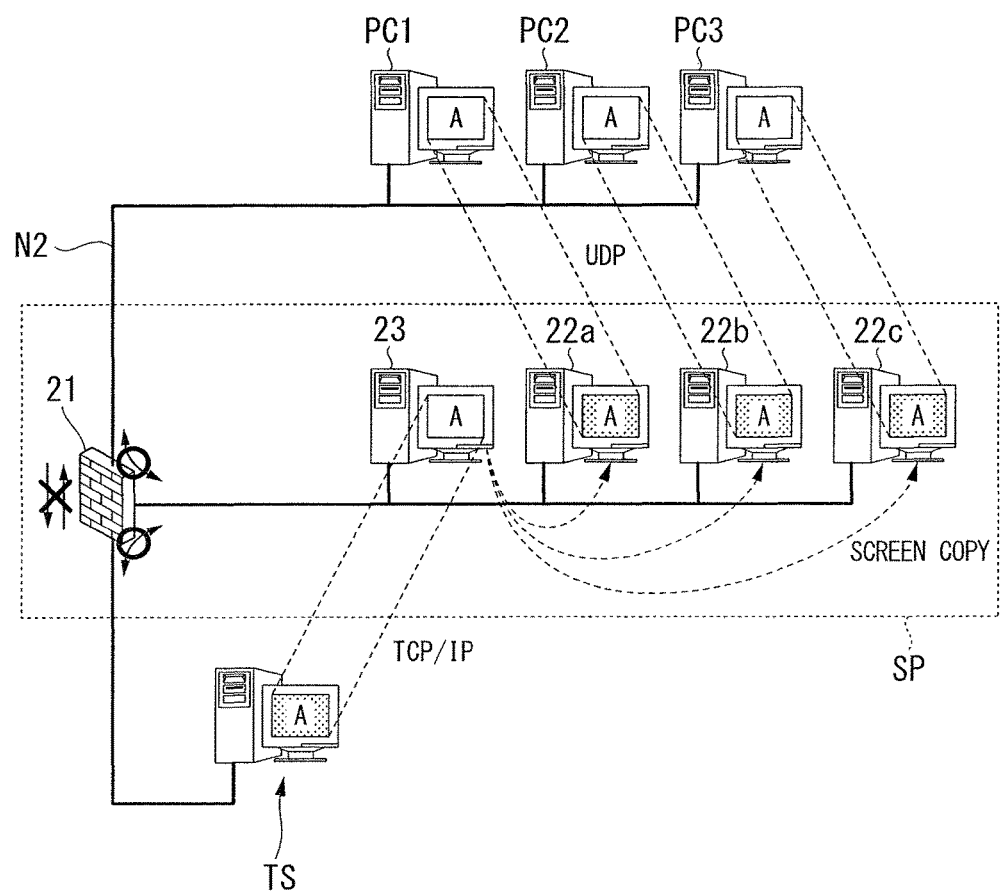
FIG. 5 is a drawing illustrating the step system SP in the present embodiment.

FIG. 5 is a drawing illustrating the step system SP in the present embodiment. As shown in FIG. 5, the step system SP is equipped with a firewall 21, terminal devices 22a to 22c, and a screen output terminal 23. Terminal devices PC1 to PC3 shown in FIG. 5 are terminal devices which are disposed in the client A, the bases b1 to b3 in the engineering company B, and the third vendor C.

The firewall 21 is disposed between the private line N2 and the target system TS. The firewall 21 inhibits a direct communication between the terminal devices PC1 to PC3 and the target system TS. However, the firewall 21 permits a communication between the terminal devices PC1 to PC3 and the terminal devices 22a to 22c, and the firewall 21 permits a communication between the terminal devices 22a to 22c, the screen output terminal 23, and the target system TS, so as to implement the indirect remote access from the terminal devices PC1 to PC3 to the target system TS.

The terminal devices 22a to 22c are disposed so that the terminal devices 22a to 22c receive the remote access from the terminal devices PC1 to PC3 and implement the indirect remote access. The terminal devices 22a to 22c correspond to the terminal devices PC1 to PC3 respectively. That is, the terminal devices 22a to 22c are disposed in accordance with a number of the client A, the bases b1 to b3 in the engineering company B, and the third vendor C which are to access the target system TS.

The screen output terminal 23 makes a copy (screen copy) of display contents of the target system TS which is to display on the terminal devices 22a to 22c, and the screen output terminal 23 transmits the copy to the terminal devices 22a to 22c. The screen output terminal 23 is disposed so as to share the display contents of the target system TS among the client A and the others performing the remote access to the terminal devices 22a to 22c by using the terminal devices PC1 to PC3.

The terminal devices PC1 to PC3, which perform the remote access to the terminal devices 22a to 22c, display the same contents as the contents displayed on the terminal devices 22a to 22c. For the reason, in a case where the screen output terminal 23 displays the display contents of the target system TS on the terminal devices 22a to 22c, the client A and the others using the terminal devices PC1 to PC3 can share the display contents of the target system TS.

The screen output terminal 23 is disposed so as to prevent the target system TS from being operated improperly. In conventional way, the terminal device receives the remote access, and the screen of the terminal device is occupied (for example, occupied by a logon screen). For the reason, it is difficult for a person on the outside to know the contents of the remote access. On the other hand, by disposing the screen output terminal 23, the display contents of the target system TS are displayed on the terminal devices 22a to 22c which received the remote access. Therefore, improper operations with respect to the target system TS can be prevented.

Figure 6:
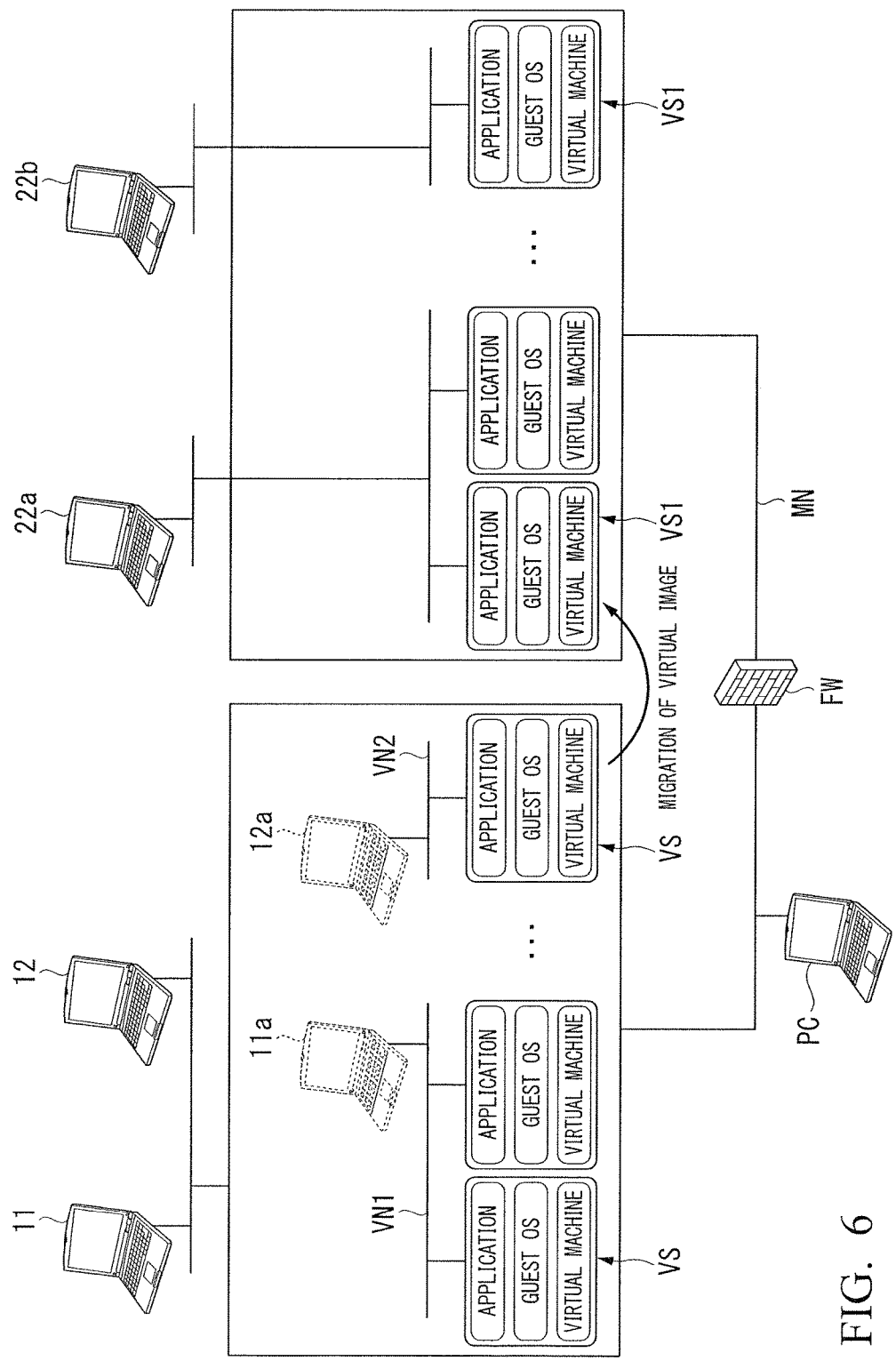
FIG. 6 is a drawing illustrating a migration of the virtual image of the virtual system used in the present embodiment.

The virtual system VS1 is implemented by moving (migrating) a program (a virtual image), which implements the engineering system which is virtually implemented on the virtual system VS shown in FIG. 2, to a computer disposed in the communication system 20. FIG. 6 is a drawing illustrating a migration of the virtual image of the virtual system used in the present embodiment. As shown in FIG. 6, the virtual image of the virtual system VS is migrated via a management network MN which is managed by a management computer PC, and a firewall FW is connected to the management network MN.

In the communication system CS2 shown in FIG. 4, if necessary, a communication test can be conducted by connecting a subsystem D to the third vendor C. In the communication system CS2 shown in FIG. 4, in a case where an environment of the internet N is good and a lot of costs are needed to connect to the private line N2, as the EPC shown in FIG. 4, the connection to the private line N2 by the internet-VPN may be allowed.

(Detail Descriptions of the Communication System CS3)

Figure 7:
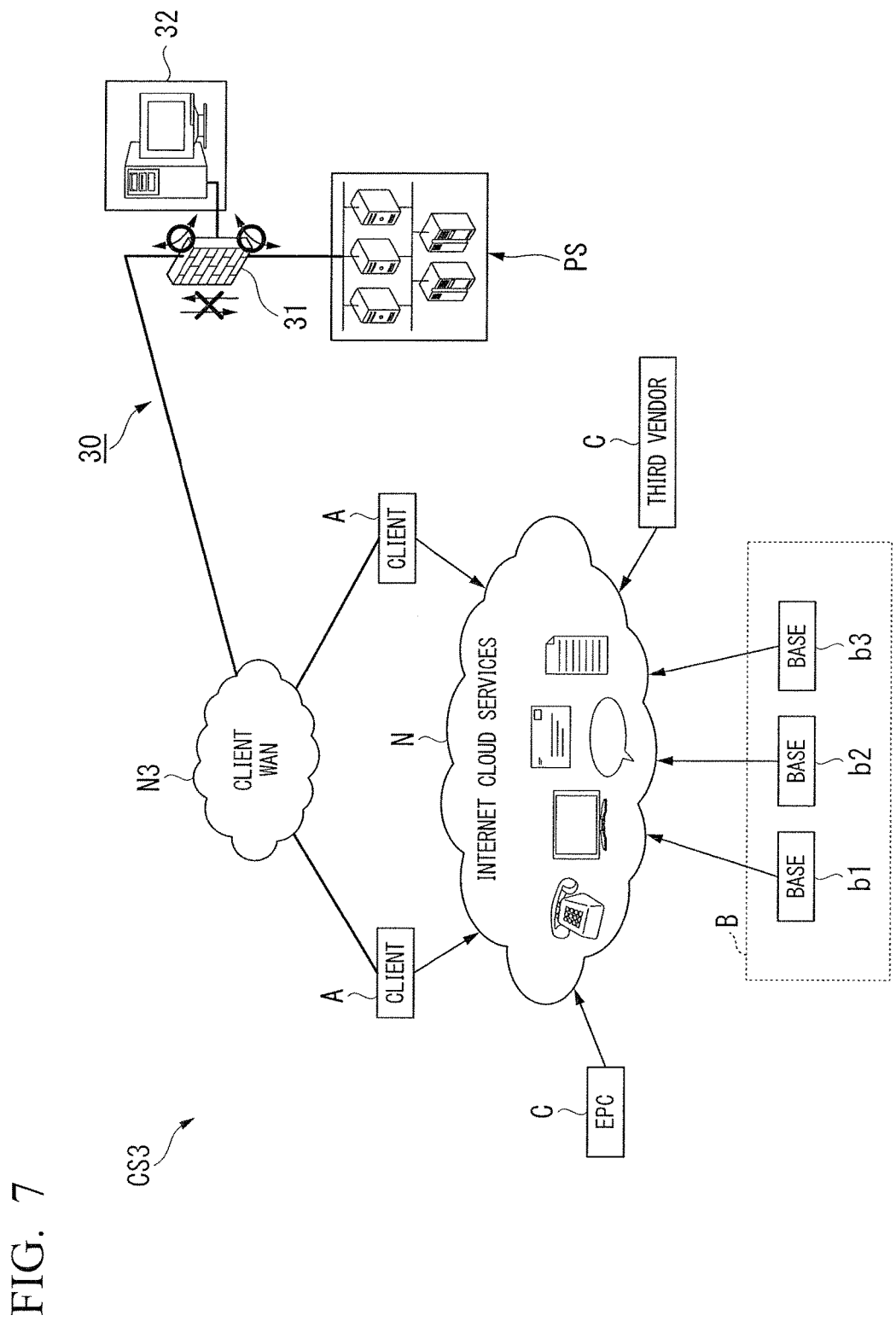
FIG. 7 is a drawing illustrating the communication system CS3 used in the engineering method and the establishing system in the present embodiment.

FIG. 7 is a drawing illustrating the communication system CS3 used in the engineering method and the establishing system in the present embodiment. As shown in FIG. 7, in the communication system CS3, in common with the communication system CS1 shown in FIG. 2, the client A, the bases b1 to b3 in the engineering company B, and the third vendor C are connected to each other via the internet N. The client A, the bases b1 to b3 in the engineering company B, and the third vendor C can communicate by using the internet cloud services which are provided via the internet N.

As shown in FIG. 7, a communication system 30 (a third communication system) which has a client network N3 connecting between the client A and the plant system PS is disposed in the communication system CS3. In common with the corporate network N1 shown in FIG. 2, the client network N3 is established as the WAN. Although not shown in the drawing, terminal devices are disposed in the client A. The terminal devices are connected to the internet N and the client network N3, and the terminal devices can access the plant system PS.

The communication system 30 is equipped with a fire wall 31 and a DMZ (DeMilitarized Zone) system 32 which are disposed between the client network N3 and the plant system PS. So as to maintain the security, the firewall 31 inhibits a direct communication from the client network N3 to the plant system PS, and the firewall 31 inhibits a communication from the plant system PS to the internet cloud services.

However, the firewall 31 permits a communication from the client network N3 to the DMZ system 32, and the firewall 31 permits a communication between the DMZ system 32 and the plant system PS, so as to implement the indirect access from the client network N3 to the plant system PS. The DMZ system 32 is disposed so as to prevent an unauthorized access from the client network N3 to the plant system PS.

Because the bases b1 to b3 in the engineering company B and the third vendor C cannot basically access to the communication system 30 via the internet N, the bases b1 to b3 and the third vendor C cannot access to the plant system PS. However, in a case where the bases b1 to b3 in the engineering company B and the third vendor C obtain a permission from the client A, the bases b1 to b3 and the third vendor C can access to the plant system PS via a terminal device (not shown) disposed in the client A.

(Engineering Method)

Next, an engineering method in which the communication systems CS1 to CS3 are used will be described. In a case of establishing the engineering system, as shown in FIG. 1, the basic design (BD), the detailed design (DD), and the internal test (IT) in the feed phase and the engineering phase are sequentially conducted by using the communication system CS1 (first step).

Specifically, the client A, the engineering company B, and the third vendor C communicate with each other by using the services which are provided via the internet N (refer to FIG. 2), and the client A, the engineering company B, and the third vendor C examine technical problems of the engineering system, which is to be established in the virtual system VS, estimated costs, and so on, so that the basic design and the detailed design are conducted. Thereafter, hardware is ordered, software is programed, and the engineering system is virtually established in the virtual system VS so as to conduct the operation test.

At this time, the client A and the third vendor C obtain permission from engineers operating the terminal devices (terminal devices 11 and 12 shown in FIG. 3) disposed in the bases b1 to b3, and the client A and the third vendor C indirectly access to the virtual system VS via the terminal devices 11 and 12 which are operated by the engineer. Thereafter, the software is programed, the engineering system is virtually established in the virtual system VS, and the operation test is conducted, while the client A and the third vendor C indirectly access to the virtual system VS.

Figure 8:
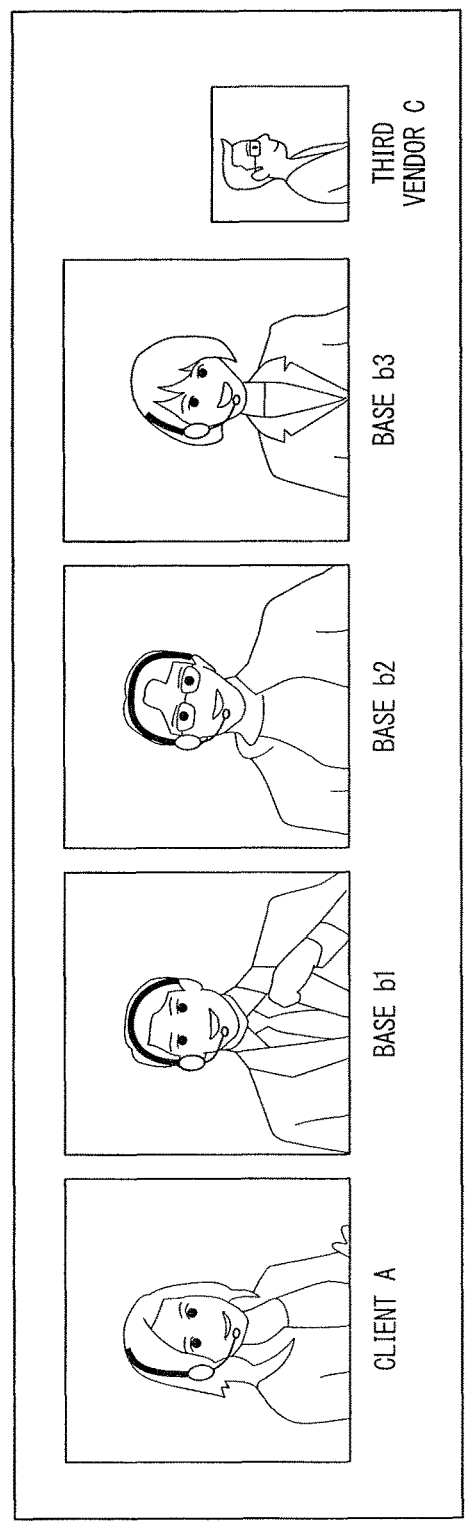
FIG. 8 is a drawing illustrating a communication by a television conference with voice and video.

FIG. 8 is a drawing illustrating a communication by a television conference with voice and video. FIG. 8 shows a situation, in which the client A, the bases b1 to b3 in the engineering company B, and the third vendor C communicate with each other by the television conference with voice and video. As shown in FIG. 8, images of the client A, the bases b1 to b3 in the engineering company B, and the third vendor C are displayed on each display of the terminal devices which are disposed in the bases b1 to b3 in the engineering company 13 and the third vendor C. The client A, the bases b1 to b3 in the engineering company B, and the third vendor C communicate with each other with voice while referring to the images displayed on the each terminal device. The images displayed on the each terminal device are merely an example, and the images may be changed as required.

Next, as shown in FIG. 1, a factory acceptance test (FAT) in the engineering phase is conducted by using the communication system CS2 (second step). Specifically, the client A, the bases b1 to b3 in the engineering company B, and the third vendor C access (remotely access) to the target system TS in the engineering company B via the private line N2 (referring to FIG. 4) so as to inspect the target system TS.

At this time, by the action of the firewall 21 in the step system SP shown in FIG. 5, the terminal devices 22a to 22c accept the remote access from the client A, the bases b1 to b3 in the engineering company B, and the third vendor C to the target system TS. Therefore, the client A, the bases b1 to b3 in the engineering company B, and the third vendor C can indirectly access to the target system TS via the terminal devices 22a to 22c, and the target system TS can be inspected.

When the target system TS is accessed, the screen output terminal 23 disposed in the step system SP transmits display contents of the target system TS to the terminal devices 22a to 22c. The terminal devices 22a to 22c receive the display contents of the target system TS, and the terminal devices 22a to 22c display the received display contents of the target system TS on each display of the terminal devices 22a to 22c. Thereafter, the display contents of the target system TS are also displayed on the terminal devices (the terminal devices PC1 to PC3 (shown in FIG. 5) which is used by the client A, the bases b1 to b3 in the engineering company B, and the third vendor C) which perform the remote access to the terminal devices 22a to 22c. Therefore, the display contents of the target system TS are shared among the client A, the bases b1 to b3 in the engineering company B, and the third vendor C.

FIG. 9A is a drawing illustrating an example of a display screen of the present embodiment when the factory acceptance test is conducted. FIG. 9B is a drawing illustrating an example of a display screen of the old way when the factory acceptance test is conducted. In FIG. 9A, the display screen W11 is a display screen of the terminal device (for example, the terminal device 23 shown in FIG. 5). The terminal device (for example, the terminal device 22a in FIG. 5), which accepts the remote access, displays a copy image of the display screen W11. The display screen W12 is a display screen of the terminal device (for example, the terminal device PC1 shown in FIG. 5) which performs the remote access.

Because the display screen W11 is the same as the display screen W12, the display contents of the target system TS can be checked by both the terminal device performing the remote access and the terminal device accepting the remote access. Therefore, in the present embodiment, the client A, the bases b1 to b3 in the engineering company B, and the third vendor C, which are in a remote location, can check the display contents of the target system TS by referring to the display screen W12 of the terminal device which performs the remote access. Also, in the present embodiment, the engineer in the engineering company 13 can check whether an operation with respect to the target system TS is improper or not by referring to the display screen W11 of the terminal device which accepts the remote access.

In FIG. 9B, the display screen W21 is a display screen of the terminal device which accepts the remote access, and the display screen W22 is a display screen of the terminal device which performs the remote access. Although the display screen W22 is the same as the display screen W12 shown in FIG. 9A, the display screen W21 is a logon screen. As described above, in the old way, the display screen which accepts the remote access is occupied, and the display contents of the target system TS cannot be checked. For the reason, different from the present embodiment, it is difficult for the engineer in the engineering company B to check whether an operation with respect to the target system TS is improper or not.

In the communication system CS2, although the access from the internet N to the private line N2 is inhibited, the access from the private line N2 to the services which are provided via the internet N is permitted. For the reason, the client A, the engineering company B, and the third vendor C can communicate with each other by using the services which are provided via the internet N.

Figure 10:
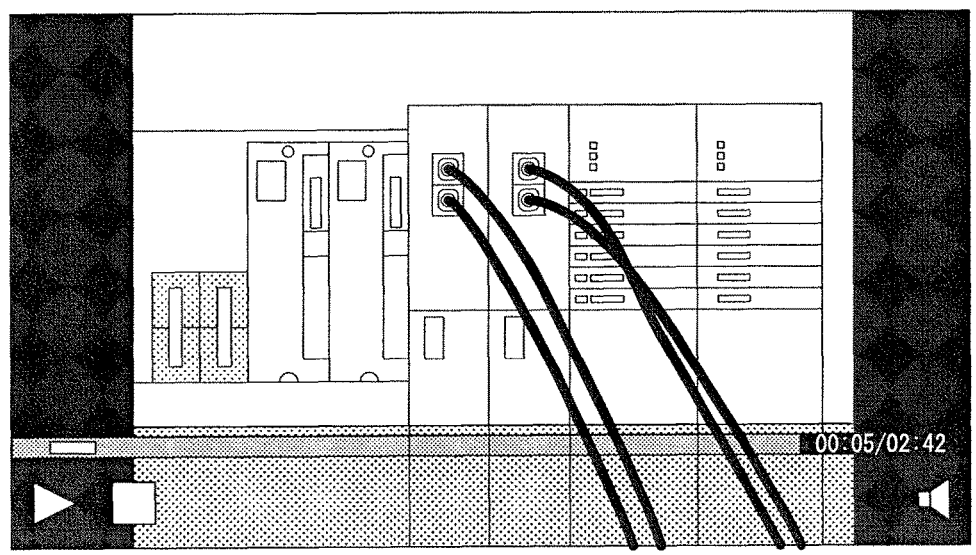
FIG. 10 is a drawing illustrating an example of an image data used in an inspection of hardware in the present embodiment.

FIG. 10 is a drawing illustrating an example of an image data used in an inspection of hardware in the present embodiment. For example, as shown in FIG. 10, in a case where the image data (a still image or a moving image) is uploaded to the file sharing service which is provided via the internet N, the client A, the engineering company B, and the third vendor C can inspect (appearance check, and numerical check) of the hardware in presence of the concerned parties by accessing the file sharing service.

In a case where a real time moving image is necessary, such as a case of a system check of hardware, a moving image of a video camera may be shared, and the moving image may be changed in accordance with an instruction of the client A, the bases b1 to b3 in the engineering company B, and the third vendor C. In this case, it is more effective to use a streaming technology for the real time moving image so as not to delay the upload of the moving image.

After the factory acceptance test (FAT) in the engineering phase described above is finished, as shown in FIG. 1, the site activity phase is conducted by using the communication system CS3 (third step). However, in the site activity phase, because the plant system PS established in the plant is connected to the internet N via the client network N3 (referring to FIG. 7), the site activity phase, in which the communication system CS3 is used, is conducted only when the permission from the client A is obtained.

Specifically, the bases b1 to b3 in the engineering company B and the third vendor C obtain the permission from the client A, and the bases b1 to b3 and the third vendor C indirectly access to the plant system PS via the terminal device (not shown) which is used in the client A. Thereafter, the bases b1 to b3 in the engineering company B and the third vendor C perform the site acceptance test (SAT) and the performance inspection (Commissioning) while indirectly accessing to the plant system PS.

In the communication system CS3, the client A, the bases b1 to b3 in the engineering company B, and the third vendor C are also connected to the internet N. For the reason, the client A, the bases b1 to b3 in the engineering company B, and the third vendor C can communicate with each other by using the services which are provided via the internet N.

As described above, in the present embodiment, in the basic design (BD), the detailed design (DD), and the internal test (IT) in the feed phase and the engineering phase, the communication is performed by using the services which are provided via the internet N. Further, the access to the virtual system VS via the internet N is permitted, and the engineering system is established in the virtual system VS.

In the factory acceptance test (FAT) in the engineering phase, by using the communication system CS2, the target system TS is accessed via the private line N2 so as to inspect the target system TS. Further, in the site activity phase, by using the communication system CS3, the communication is performed by using the services which are provided via the internet N, and the access to the plant system PS via the internet N is permitted, so as to conduct the test with respect to the plant system PS.

For the reason, the present embodiment provides following benefits at the each phase.

(1) Feed Phase
  Because thorough meetings can be conducted from remote locations, the working hours of the engineer can be shorter.
  By introducing the virtual system VS, the inspection of the system can be conducted easily in the feed phase.
(2) Engineering Phase
  Because there is no need to get together in one place to inspect, travel expenses can be reduced significantly.
  Because the system can be established in the virtual system VS, an engineering efficiency can be improved.
  A large space for staging is unnecessary when the inspection is conducted in the presence of the concerned parties.

By using the step system SP, when the remote access is performed, infection of a malware and hacking can be prevented, operations from outside can be known, and behavior of the system can be better.

The communication test with respect to the third vendor can be conducted.

(3) Site Activity Phase

Skilled engineers in remote locations can easily understand the situation of the field site, and the working hours of the skilled engineers can be shorter.

Although the engineering method and the establishing system according to the embodiments of the present invention have been described above, the present invention is not restricted to the above-described embodiments, and can be freely modified within the scope thereof. For example, although the foregoing descriptions of the embodiments have been examples in which the engineering system is established as the distributed control system, the present invention can be applied to a safety instrumented system and other systems.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An engineering method for establishing an engineering system in a plant, comprising:
   a first step of establishing a virtual engineering system that is a virtual implementation of the engineering system in a virtual system by performing a communication and permitting an access to the virtual system via the Internet via which a client, bases in an engineering company, and a third party vendor are connected to each other, the virtual system being provided in a first communication system which is provided in the engineering company and connected to the Internet, the communication being performed by using a service which is provided via the Internet and is used by the first communication system; and
   a second step of inspecting the virtual engineering system by performing an access to an inspection system via a virtual private network, the access is performed by a second communication system which is provided in the engineering company and is connected to the virtual private network, the inspection system being disposed in the second communication system, and the inspection system inspecting operations of the virtual engineering system which is established in the virtual system,
   wherein, in the second step, the engineering method further comprising:
      relaying, by a relay system, the access from the client and the third party vendor to the inspection system via the virtual private network, the relay system being disposed in the second communication system and configured to access to the inspection system;
      converting, by the relay system, between a communication protocol used by the virtual private network and a communication protocol used by the second communication system;
      censoring, by the relay system, a remote access to the inspection system;
      inhibiting, by a firewall disposed in the relay system, a direct communication between a first terminal device and the inspection system, the first terminal device being disposed in the client, the bases in the engineering company, or the third vendor;
      permitting, by the firewall, a communication between the first terminal device and a second terminal device disposed in the relay system; and
      permitting, by the firewall, a communication between the second terminal device and the inspection system.

2. The engineering method according to claim 1, further comprising:
   transmitting, by the inspection system, display contents displayed on the inspection system to the relay system;
   receiving, by the relay system, the display contents transmitted from the inspection system; and
   transmitting, by the relay system, the received display contents to a first terminal device via the virtual private network, the first terminal device accessing to the inspection system.

3. The engineering method according to claim 1, wherein the virtual private network is connected to the Internet,
   an access from the virtual private network to the service which is provided via the Internet is permitted, and
   an access from the Internet to the virtual private network is inhibited.

4. The engineering method according to claim 1, further comprising:
   examining an actual engineering system by performing a communication and permitting an access to the actual engineering system via the Internet, the communication being performed by using the service which is provided via the Internet, the service being used by a third communication system which is connected to the Internet, and the third communication system being connected to the actual engineering system established in the plant.

5. An engineering method of establishing an engineering system in a plant, the method comprising:
   performing a communication via a first network to a virtual system which is included in a first communication system, a client, bases in an engineering company and a third party vendor being connected to each other via the first network, the first communication system being provided in the engineering company, the virtual system being for virtually establishing the engineering system;

permitting a first access to the virtual system via the first network, the first access being from the outside of the virtual system;

establishing an inspection system in a second communication system provided in the engineering company, the inspection system being for inspecting a virtual engineering system which is a virtual implementation of the engineering system, the inspection system being virtually established in the virtual system;

performing a second access to the inspection system via a second network which is a secured network, the second access being from the outside of the inspection system;

relaying, by a relay system, the second access from the client and the third party vendor to the inspection system via the second network, the relay system being disposed in the second communication system and configured to access to the inspection system;

converting, by the relay system, between a communication protocol used by the virtual private network and a communication protocol used by the second communication system;

censoring, by the relay system, a remote access to the inspection system;

inhibiting, by a firewall disposed in the relay system, a direct communication between a first terminal device and the inspection system, the first terminal device being disposed in the client, the bases in the engineering company, or the third vendor;

permitting, by the firewall, a communication between the first terminal device and a second terminal device disposed in the relay system; and permitting, by the firewall, a communication between the second terminal device and the inspection system.

6. The engineering method according to claim 5, further comprising:
converting, by the relay system, between a first protocol used in the second network and a second protocol used in the second communication system.

7. The engineering method according to claim 5, further comprising:
censoring, by the relay system, the access via the second network to the inspection system.

8. The engineering method according to claim 5, further comprising:
transmitting, by the inspection system, display contents displayed on the inspection system to the relay system;
receiving, by the relay system, the display contents transmitted from the inspection system; and
transmitting, by the relay system, the received display contents to a first terminal device via the second network, the first terminal device accessing to the inspection system.

9. The engineering method according to claim 8, wherein a screen output terminal is disposed in the relay system,
the screen output terminal makes a copy of the display contents displayed on the inspection system, and
the second terminal device accepts a remote access from the first terminal device.

10. The engineering method according to claim 5, wherein
the second network is connected to the first network,
an access from the second network to a service which is provided via the first network is permitted, and
an access from the first network to the second network is inhibited.

11. The engineering method according to claim 10, wherein
the first network is the Internet,
the second network is a virtual private network, and
the service is an internet cloud service which includes at least one of a mail service, an IP telephone service, a file sharing service, an instant messaging service, and a television conference service.

12. The engineering method according to claim 10, further comprising:
communicating, by a third communication system, with an actual engineering system by using the service, the actual engineering system being established in a plant, and the third communication system being connected to the first network and the actual engineering system.

13. The engineering method according to claim 12, further comprising:
examining the actual engineering system by permitting an access to the actual engineering system via the first network.

14. An establishing system for establishing an engineering system in a plant, comprising:
a first communication system configured to be connected to the Internet, and equipped with a virtual system which virtually implements the engineering system, the first communication system establishing a virtual engineering system that is a virtual implementation of the engineering system in the virtual system by performing a communication and permitting an access to the virtual system via the Internet via which a client, bases in an engineering company, and a third party vendor are connected to each other, the first communication system performing the communication by using a service which is provided via the Internet, the first communication system being provided in the engineering company; and
a second communication system configured to be connected to a virtual private network and equipped with an inspection system which inspects operations of the virtual engineering system which is established in the virtual system, the second communication system inspecting the virtual engineering system by performing an access to the inspection system via the virtual private network, the second communication system being provided in the engineering company,
wherein the second communication system comprises a relay system configured to access to the inspection system,
wherein the relay system is configured to;
relay the access from the client and the third party vendor to the inspection system via the virtual private network,
convert between a communication protocol used by the virtual private network and a communication protocol used by the second communication system, and
censor a remote access to the inspection system,
wherein a firewall is disposed in the relay system,
wherein a first terminal device is disposed in the client, the bases in the engineering company, or the third party vendor,
wherein a second terminal device is disposed in the relay system,
wherein the firewall is configured to inhibit a direct communication between the first terminal device and the inspection system, wherein the firewall is configured to permit a communication between the first terminal device and the second terminal device, and wherein the firewall is configured to permit a communication between the second terminal device and the inspection system.

15. The establishing system according to claim 14, wherein the inspection system is configured to transmit display contents displayed on the inspection system to the relay system, the relay system is configured to receive the display contents transmitted from the inspection system, and the relay system is configured to transmit the received display contents to a first terminal device, which accesses to the inspection system, via the virtual private network.

* * * * *